United States Patent Office 3,475,300
Patented Oct. 28, 1969

3,475,300
PROCESS UTILIZING ION EXCHANGE MEMBRANE FOR ELECTROLYTIC REDUCTION OF AROMATIC NITRO COMPOUNDS
Philip Ward Staal, Elkhart, Ind., assignor to Miles Laboratories, Inc., Elkhart, Ind., a corporation of Indiana
No Drawing. Filed Feb. 2, 1966, Ser. No. 524,505
Int. Cl. B01k 3/10
U.S. Cl. 204—74                 12 Claims

ABSTRACT OF THE DISCLOSURE

An electrolytic reduction process for treating aromatic nitro compounds, such as nitrobenzene, can have improved yields when the electrolytic cell employs an ion exchange resin membrane to separate the anolyte bath from the catholyte bath. This membrane is substantially non-porous to water and permeable to ions.

---

This invention relates to an improvement in processes for the electrolytic reduction of aromatic nitro compounds. The improvement is the use of ion exchange resins as semipermeable membranes for separating the anolyte from the catholyte.

Former reduction processes for aromatic nitro compounds have employed ceramic membranes. For success the pores in such membranes had to have diameters small enough to prevent the reducible nitro compound from migrating from the catholyte into the anolyte, but not so small as to restrict transport of the current conducting ions. The use of such membrane material in hydrous cells allowed unrestricted transport of both cations and anions. When the same electrolyte was employed for both catholyte and anolyte this free transport of ions allowed a build-up of the electrolyte in one of the compartments.

Specifically, in the reduction of nitrobenzene where aqueous sulfuric acid was present in both the catholyte and anolyte baths the unrestricted transport of sulfate ions resulted in an increase in sulfuric acid concentration in the anolyte which then allowed the anode to become chemically corroded. The only available protection was continuous change of the anolyte composition.

Other difficulties with such former membranes were their tendency to disintegrate under cell conditions and their fragility. With such membranes isolated yields in the range of 40 to 65 percent were realized for reduction of nitrobenzene.

It is therefore an object of the present invention to provide membranes for electrolytic reduction processes which limit ion transport while also restricting migration of the material being reduced and which are chemically inert and nonfragile.

Another object is to provide a process for reducing aromatic nitro compounds more efficiently and with higher yields than formerly possible.

Yet another object is to reduce nitrobenzene to phenlyhydroxylamine using a cationic membrane which prevents build-up of electrolyte in the anolyte.

Briefly, these objects are realized by utilizing either a cationic resin or an anionic resin as the membrane material for an electrolytic cell having standard anolyte and catholyte baths. The resins are preferably impregnated on a chemically inert porous support member. Isolated yields as high as 73 percent have been realized by employing these membranes.

The cationic resin employed as a semipermeable membrane material of this invention can be any of those described in U.S. Patents 2,730,768; 2,731,408; 2,731,411; and Re. 24,865. The preferred types are generally composed of a thermoplastic copolymer of styrene and divinyl benzene containing ionizable sulfonic acid groups chemically bonded to the copolymer. The sulfonic acid groups can be represented by the formula —$SO_3^-$ . . . $M^+$, wherein $M^+$ is a metal cation. Tylically $M^+$ is $H^+$, $Na^+$, $Ca^{++}/2$, or $Mg^{++}/2$. This resin, when wetted, has a fixed negtaive charge and repels anions. Due to this fixed charge sulfate ions will not be transported through the pores in the resin to the anolyte where their increased concentration would corrode the anode.

The anionic resin employed as a semipermeable membrane material can be any of those described in U.S. Patents 2,730,768, 2,731,425, 2,732,350, 2,732,351, 2,860,-097, and Re. 24,865. The preferred types are composed of a polymer of styrene, divinyl benzene, and a monomer containing ionizable amine groups. The amine groups are quaternary in structure and can be represented by the formula —$N(R')_3(R^2)^+$ . . . $Y^-$, wherein $R'$ are lower alkyl groups or bonds in a heterocyclic ring and $R^2$ is a lower alkyl group and $Y^-$ is an anion. The anion is preferably chloride ion, but may be sulfate ion or bicarbonate ion as well as other anions. The term "lower alkyl" as used herein includes groups having from one to four carbon atoms.

Since both cationic and anionic resins have thermoplastic copolymer backbone structures they are nonfragile and hence can be installed and removed for cleaning without breakage.

The ion exchange resins have pores of a size range which render them substantially non-porous to the organic compounds present as well as to water, but permeable to ions. The upper limit of the pore size range is below the mean free path dimension of molecules of the reducible aromatic nitro compounds while the lower limit is at least as large as the mean free path dimension of the current conducting ions. The ions which conduct current through the membranes vary depending upon whether the resin is cationic or anionic. Hydrogen ions are transported through the cationic membrane and sulfate ions would pass through this membrane if the fixed negative charge were eliminated. Sulfate ions conduct the current through the anionic membrane and it is believed that due to their relatively smaller radius hydrogen ions also pass through the anionic resin despite its fixed positive charge. The pore size range is nearly identical for the two types of ion exchange resins and is about from 1 to about 10 Angstroms which renders the membranes substantially water impermeable under the hydraulic pressures normally encountered in use for the present process.

The water content of the resins in the dry state is between 30 to 55 weight percent and is localized in the pores. By use of either type of resin improved isolated yields are attainable.

Preferred membranes are formed by polymerizing a matrix resin in situ on the porous support member according to the teachings of the above patents. The support members are generally constructed of fabrics woven from fibers of a noncorrosive thermoplastic material. Foremost among these fibers are dynel (vinyl chloride-acrylonitrile copolymer), glass, and polyvinylidene chloride-vinyl acetate copolymers. The fabrics of these materials are tightly woven, usually about 24 threads per inch and have weights of about from 14 to 28 mg./cm.² Matted fiber support members of such materials can also be employed as can treated cellulose battery paper, polystyrene-coated glass fiber mat and polyvinyl chloride battery paper.

The membranes constructed of the resin impregnated support member have a thickness of approximately 25 mils and bursting strengths of about 9 kg./cm.²

The membranes of this invention may be installed in any cell designed for the reduction of aromatic nitro compounds and containing hydrous anolyte and catholyte baths. Provision is made for reflux condensers and thermometers for either one or both compartments. The cathode-anode distance is generally about 10 to 12 inches. The cell is preferably constructed of heat resistant glass. Any of the several standard electrolytes can be employed in either or both the catholyte or anolyte baths. About from 1.0 to 10.0 N $H_2SO_4$ may be employed, with the preferred normality being about from 1.0 N to 2.5 N.

The anode may be lead, platinum, or carbon. The submerged area of the anode is not critical, but is usually maintained equivalent to the submerged surface area of the cathode. Various materials may be employed as cathode materials, some of which have not heretofore been employed in processes of this type. Included in the usable metals are commercially pure (+99 percent) titanium, silver, and molybdenum. Hastelloy C alloy, Monel metal alloy, and Ni-O-Nel alloy are trade-named alloys which can be used. Also an alloy of 45 to 65 percent copper, 10 to 18 percent nickel, and 17 to 45 percent zinc, referred to herein as Cu-Ni-Zn alloy, can be used. Silver and Hastelloy C alloy are the preferred cathode materials.

These anode and cathode materials are corrosion resistant in the electrolytes normally employed for such reduction processes. The anode and cathode metals may be of bar, rod, or mesh form. While great variation in submerged cathode areas is possible, 0.6 to 0.7 $dm.^2$ (square decimeter) areas have been generally used. The effective area of cathode screen mesh is measured by the peripheral dimensions of the submerged screen.

While any of the electrolytically reducible aromatic nitro compounds may be reduced in a cell employing the cationic or anionic membranes, the use of these membranes has been shown herein by reduction of nitrobenzene. In this manner comparison of parameters and membranes is facilitated. Also reduction of nitrobenzene represents one of the most important commercial electrolytic reductions of an aromatic nitro compound since phenylhydroxylamine is the direct product and the acid salt of p-aminophenol (PAP) is produced by its rearrangement. PAP can then be liberated by treatment with an alkaline material. 2,4 - dinitrotoluene and 2,4,6-trinitrotoluene are normally excluded from the term "electrolytically reducible aromatic nitro compounds" due to the difficulties in handling the same.

The following are process parameters for reduction of nitrobenzene in 2.5 N sulfuric acid catholyte: temperature, 70° C. to 95° C., preferably 70° C. to 85° C.; potential, 8 volts to 17 volts; current density, 6.7 amp./$dm.^2$ to 20 amp./$dm.^2$ based on effective cathode area; and nitrobenzene concentration, not over 10 weight percent of the weight of the catholyte. The total reaction time and the ampere-hours of direct current supplied vary with the total amount of nitrobenzene present. For 10 weight percent approximately 60 to 70 ampere-hours are required. Four Faradays per gram molecular weight are required for reduction of nitrobenzene.

By employing the membranes of the present invention current efficiencies of about from 57 to 67 percent may be realized. Current efficiency is defined as current for PAP recovered over actual current used.

Preferred current densities for the various cathode metals are as follows:

| | Amp./$dm.^2$ |
|---|---|
| Hastelloy C alloy | 6.7–13.3 |
| Silver | 10–20 |
| Monel metal alloy | 8.3–16.7 |
| Titanium | 8.3–16.7 |
| Ni-O-Nel | 8–14.3 |
| Molybdenum | 8–16.0 |
| Cu-Ni-Zn alloy | 8–14.3 |

The reduction of an aromatic nitro compound to an intermediate product and conversion thereof to a product of ultimate utility may be described by reference to nitrobenzene. The electrolytes are placed in the catholyte and anolyte compartments and the initial current established. The cell is simultaneously heated to at least about 55° C. and preferably to near the final temperature. Nitrobenzene is then added in small amounts once each hour, up to a total of not more than 10 weight percent based on the catholyte weight. The reduction of available nitrobenzene is signalled by $H_2$ evolution at the cathode. The catholyte containing the acid salt of PAP is removed and distilled to approximately one half its original volume. The concentrate is then adjusted to pH 3.5 with $NH_4OH$ solution and filtered to remove insoluble tars. The filtrate is then treated with $NaHSO_3$ and $Na_2S_2O_4 \cdot 2H_2O$, stirred, and passed through a carbon column (13 mm. I.D. x 110 cm. long) containing 50 g. activated carbon. The column is washed with $H_2O$ and the effluent adjusted to pH 7.0 to 7.2 with $NH_4OH$ solution and thereafter distilled to remove aniline and water until PAP starts to precipitate at 100° C. at which time distillation is terminated. The liquid residue is then adjusted to pH 7.0 with $NH_4OH$ solution. It is cooled to about from 15° C. to 20° C., filtered, washed with $H_2O$ and 1 percent $NaHSO_3$, and dried under vacuum at 50° C. The resulting PAP may be employed to produce acetyl p-aminophenol, a well known analgesic or may be used as a dye intermediate, as an anti-oxidant, or as PAP-HCl in photographic developers.

The following examples are illustrative and are not to be limitative since those skilled in this art will understand that various modifications may be made therein without departing from the spirit and scope of the invention.

EXAMPLE I

Two flanged heat-resistant glass elbows of 3 inches I.D. were bolted together with an anionic semipermeable membrane interposed between the flanges. One leg of the resulting U-cell provided a catholyte compartment while the other leg was used as the anolyte compartment. Each compartment was fitted with a thermometer and an agitator. The catholyte compartment was also fitted with a reflux condenser. A heating coil was then placed about the catholyte compartment while a cooling coil was placed in the anolyte compartment. A cylindrically shaped Monel metal screen of 40 mesh size having an effective area of 0.6 $dm.^2$ was inserted into the catholyte compartment for Run 1 and connected to a potential source of electric current. A lead strip was then inserted in the anolyte compartment to provide a submerged area of 0.6 $dm.^2$ and connected to the current source. Run 2 was conducted with a 20 mesh Monel metal screen of the same effective area.

The Monel metal of the cathode contained elements in the following percentage ranges: 60 to 70 nickel, 25 to 35 copper, 1 to 3 iron, 0.25 to 2 manganese, 0.02 to 1.5 silicon and 0.3 to 0.5 carbon.

850 ml. of a 2.5 N aqueous solution of $H_2SO_4$ were added for the anolyte. The catholyte consisted of 750 ml. of a 2.5 N aqueous solution of $H_2SO_4$.

The anionic membrane was composed of a dynel (vinyl chloride-acrylonitrile copolymer) fabric weighing 4 oz./$yd.^2$ (14.6 mg./$cm.^2$) impregnated with an anionic resin. The resin was a polymer of styrene and divinyl benzene containing quaternary amine groups which were electrically neutralized by chloride ions. The membrane thickness was 24 mils and the pore size was in the same range as for the cationic membranes. The resin contained 43 weight percent water based on total resin and water. The membrane exhibits a specific resistance of 16 ohm-$cm.^2$ and a specific conductance of $4 \times 10^{-3}$ mho/cm. both measured Ionics Incorporated under trade designation "NEPTON 111 BZ 183."

The cell was heated to the initial temperatures set out in Table 1 for each of the runs. The initial current densities were then established at the corresponding potentials shown. The current density for Run 1 was held at 17 amp./dm.$^2$ and for Run 2 at 8.5 amp./dm.$^2$.

TABLE 1.—RUN 1

| Reaction Time, hr. | Potential, volts | Temperature, °C. | Cumulative, amp.-hr. | Nitrobenzene, ml. |
|---|---|---|---|---|
| 0 | 13.9 | 72 | 0 | 5 |
| 0.5 | 13.1 | 81 | 5 | 5 |
| 1.0 | 13.1 | 84 | 10 | 5 |
| 1.5 | 13.5 | 80 | 15 | 5 |
| 2.0 | 13.7 | 82 | 20 | 5 |
| 2.5 | 14.2 | 84 | 25 | 3.8 |
| 3.0 | 15.1 | 83 | 33 | Total 28.8 |

RUN 2

| Reaction Time, hr. | Potential, volts | Temperature, °C. | Cumulative, amp.-hr. | Nitrobenzene, ml. |
|---|---|---|---|---|
| 0 | 8.0 | 60 | 0 | 5 |
| 1.0 | 8.2 | 62 | 5 | 5 |
| 2.0 | 8.3 | 66 | 10 | 5 |
| 3.0 | 8.4 | 67 | 15 | 5 |
| 4.0 | 9.0 | 66 | 20 | 5 |
| 5.0 | 9.2 | 65 | 25 | 3.8 |
| 6.0 | 9.5 | 65 | 30 | Total 28.8 |
| 6.5 | 10.5 | 64 | 32 | |

Polargraph assays on the two runs showed 74 percent yield for Run 1 and 64 percent yield for Run 2.

The anolyte following these runs was water clear indicating no organic matter had transferred from catholyte to anolyte.

EXAMPLE II

The same cell and semipermeable membrane as employed for Example I were used for an additional run. The anode was a lead strip and the cathode was a bar of Hastelloy C alloy with an effective area of 0.75 dm.$^2$. The composition of the Hastelloy C alloy in weight percentage is: 54 nickel, 15.0 to 17.0 molybdenum, 14.5 to 16.5 chromium, 4.0 to 7.0 iron, 3.0 to 4.5 tungsten, 2.5 cobalt, 1.0 silicon, 1.0 manganese, 0.35 vanadium, 0.08 carbon, 0.04 phosphorous and 0.03 sulfur.

The anolyte was 2.5 N $H_2SO_4$ and the catholyte was 750 ml. of 2.5 N $H_2SO_4$. 61.5 g. nitrobenzene were added to each run in the manner set out in Table 2.

The cell was heated to the initial temperature set out in Table 2. The initial current density shown was established at the corresponding potential. The current density was held at 13.3 amp./dm.$^2$ of effective cathode area.

TABLE 2

| Reaction Time, hr. | Potential, volts | Temperature, °C. | Cumulative, amp.-hr. | Nitrobenzene, ml. |
|---|---|---|---|---|
| 0 | 12.5 | 76 | 0 | 10 |
| 1.0 | 12.9 | 82 | 10 | 10 |
| 2.0 | 14.0 | 84 | 20 | 10 |
| 3.0 | 15.0 | 83 | 30 | 10 |
| 4.0 | 18.7 | 83 | 40 | 21.5 |
| 6.0 | 18.5 | 82 | 60 | Total 61.5 |

At four hours reaction time conductivity began to decrease, but was maintained by adding 10 ml. 98 percent concentrated $H_2SO_4$ to the catholyte to replace the acid transported across the semipermeable membrane.

A polargraph assay of the catholyte showed 82 percent of theoretical yield.

The catholyte liquor was then filtered and the liquid placed in a distillation flask. Nitrobenzene was then distilled off along with about 50 weight percent of the excess water. The resulting liquor was cooled to 40° C. and neutralized to pH 3.6 with $NH_4OH$ solution. The tars were then removed by filtration. $NaHSO_3$ and $Na_2S_2O_4 \cdot 2H_2O$ were then added to the filtrate which was then passed through a laboratory activated charcoal column. The effluent was neutralized to pH 7.0 with $NH_4OH$ solution and another distillation was conducted to remove further aniline and water. The mixture was then neutralized to pH 7.0 and cooled to 10° C. After filtering and oven drying 36.8 g. PAP were recovered. This represented 68 percent of theoretical yield actually recovered.

61.5 ml. nitrobenzene is equivalent to about 74 g. The cumulative total then amounted to approximately 10 weight/volume percent (g./ml.×100) of the catholyte bath.

EXAMPLE III

A series of runs were conducted in the U-cell of Example I fitted with a cationic membrane. A different cathode metal was employed for each run as set out in Table 3. A lead strip of 0.6 dm.$^2$ effective area was used for the anode. The catholyte was 750 ml. of a 2.5 N aqueous solution of $H_2SO_4$. 750 ml. of a 2.5 N aqueous solution of $H_2SO_4$ were added for the anolyte.

The cationic membrane employed as a separator for the two compartments was composed of a glass fabric backing impregnated with a cationic resin. The fabric weight was 8 ounces per square yard (27.6 mg./cm.$^2$). The cationic resin was styrene-divinyl benzene copolymer containing ionizable sulfonic acid radicals electrically neutralized by sodium ions. The thickness of the cationic membrane was 25 mils (0.6 mm.). The resin contained 33 weight percent water based on the total weight of resin plus water. The membrane exhibits a specific resistance of 22 ohm-cm.$^2$ and a specific conductance of $3 \times 10^{-3}$ mho/cm. both in 0.01 N NaCl. A membrane of this type is marketed by Ionics Incorporated under trade designation "NEPTON 61 DYG 067."

The cell was heated to the lower limit of the temperature range shown in Table 3 and the current density set out established. The amounts of nitrobenzene set out were added to the catholyte bath of the various runs in the same stepwise fashion as in Example I. The temperature and potential varied between the limits recorded.

The cathodes of Runs 1 and 3 were of commercially pure metals.

TABLE 3

| Run | Cathode | Cathode area, dm.$^2$ | Nitrobenzene, g. | Reaction time, hrs. | Temp., °C. | Potential, volts | Current density, amp./dm.$^2$ | Ampere, hrs. | Percent Isolated yield |
|---|---|---|---|---|---|---|---|---|---|
| 1 | Silver | 0.6 | 61.5 | 6.25 | 78–85 | 11.2–13.0 | 20 | 62 | 68 |
| 2 | Hastelloy C | 0.75 | 61.5 | 6.0 | 80–85 | 11.5–15.5 | 13.3 | 60 | 73 |
| 3 | Titanium | 0.6 | 32 | 21 | 38–83 | 8.5–11.7 | 8.3 | 112 | 44 |

EXAMPLE IV

The U-cell of Example I was fitted with a cationic semipermeable membrane composed of a glass fabric support impregnated with a cationic resin. The fabric weight was 8 ounces per square yard (27.6 mg./cm.$^2$). The cationic resin was of the same chemical type as that of Example III. The thickness and pore size range were also equivalent. The resin contained 52 weight percent water based on total weight of resin plus water. The membrane exhibits a specific resistance of 16 ohm-cm.$^2$ and a specific conductance of $4 \times 10^{-3}$ mho/cm. both measured in 0.01 N NaCl.

A membrane of this type is marketed by Ionics Incorporated under trade designation "NEPTON 61 AZ G 067."

A lead strip anode was then installed in the U-cell. Various cathode materials were employed in a series of runs as set out in Table 4.

750 ml. of a 2.5 N aqueous solution of $H_2SO_4$ were added to the anolyte compartment and used for all runs in Table 4. The catholyte consisted of 750 ml. of 2.5 N aqueous solution of $H_2SO_4$.

In each of the runs 61.5 g. nitrobenzene were added to the catholyte after the cell had been heated to within operating temperature range and after the specified current density had been established. The addition was in a similar stepwise manner to that employed in the experimentation of Example I.

The PAP yields were established in the same manner as in Example II and both polarograph assay yields and isolated yields have been set out in Table 4.

The Ni-O-Nel bar of Run 1 had an approximate composition by weight percentage of: 40 nickel, 31 iron, 21 chromium, 3 molybdenum, 1.75 copper, 0.60 manganese, 0.40 silicon, and 0.05 carbon. The alloy of Run 2 had a composition by weight of 65 percent copper, 18 percent nickel, and 17 percent zinc. The cathode of Run 3 was a commercially pure metal.

1.0 percent manganese, 0.35 percent vanadium, 0.08 percent carbon, 0.04 percent phosphorus and 3.03 percent sulfur; and an alloy of about 40 percent nickel, 31 percent iron, 21 percent chromium, 3 percent molybdenum, 1.75 percent copper, 0.60 percent manganese, 0.40 percent silicon, and 0.05 percent carbon.

6. A process for the electrolytic reduction of an aromatic nitro compound by application of electrical current in a cell having an anode, a cathode, and anolyte and catholyte baths separated by a semipermeable membrane comprising the steps of using for said semipermeable membrane an ion exchange resin having pores therein of a size range which renders the same substantially nonporous to water and permeable to ion transport, employing as said anolyte bath an aqueous solution of sulfuric acid having a normality in the range of about from 1 N to 10 N, and using as said catholyte bath an aqueous solution of sulfuric acid having a normality in the range

TABLE 4

| Cathode | Cathode area, $dm.^2$ | Reaction time, hrs. | Temp., °C. | Potential, volts | Current density, amp./$dm.^2$ | Ampere, hrs. | Polarograph assay | Percent isolated yield |
|---|---|---|---|---|---|---|---|---|
| Run: | | | | | | | | |
| 1 ............ Ni-O-Nel alloy ..... | 0.7 | 5.92 | 75–83 | 11.5–16.0 | 14.3 | 59 | 71.5 | 67.3 |
| 2 ............ Cu-Ni-Zn alloy ..... | 0.7 | 6.25 | 80–82 | 11.0–15.0 | 14.3 | 60 | 53 | .......... |
| 3 ............ Mo ................ | 0.6 | 6.0 | 80–83 | 11.0–16.5 | 16.0 | 60 | 83 | 68 |
| 4 ............ Hastelloy C alloy ... | 0.7 | 5.84 | 77–83 | 11.3–16.0 | 14.3 | 58.4 | 78 | 65.3 |

It can be seen that the polarograph assay uniformly results in higher yields than can actually be isolated from the catholyte. This demonstrates the uncertainty of relying solely on such readings to gain an accurate measure of the nitrobenzene reduced to the desired product.

The data of Tables 3 and 4 show that variable parameters and cathode materials may be employed with the cationic semipermeable membranes used.

In summary, a process for electrolytic reduction of reducible aromatic nitro compounds is set out by which higher isolated yields are attainable and by which purer products may be produced. The process employs an ion exchange resin membrane together with a wide range of cathode materials.

What is claimed is:

1. In a process for the electrolytic reduction of an aromatic nitro compound in a cell having hydrous anolyte and catholyte baths the improvement comprising using an ion exchange resin membrane to separate the anolyte bath from the catholyte bath, said resin membrane being substantially non-porous to water and ion-permeable.

2. The process of claim 1 wherein said ion exchange resin is impregnated into a noncorrosive porous support member.

3. The process of claim 1 wherein said ion exchange resin is impregnated into a noncorrosive porous support member constructed of a fabric woven from fibers of at least one material selected from the class consisting of vinyl chloride-acrylonitrile copolymer, glass, polyvinylidene chloride, and vinyl chloride-vinyl acetate copolymer.

4. The process of claim 1 wherein said ion exchange resin comprises a polymer of styrene-divinyl benzene containing chemically bonded ionizable radicals selected from the group consisting of $-N(R')_3(R^2)^+ \ldots Y^-$ and $-SO_3^- \ldots M^+$, wherein $R'$ is selected from the class of lower alkyl groups and bonds of a heterocyclic ring and wherein $R^2$ is a lower alkyl group, $Y^-$ is an anion and $M^+$ is a cation.

5. The process of claim 1 wherein the cathode is selected from the group consisting of titanium; molybdenum; an alloy of 45 to 65 percent copper, 10 to 18 percent nickel, and 17 to 45 percent zinc; an alloy of 54 percent nickel, 15 to 17 percent molybdenum, 14.5 to 16.5 percent chromium, 4 to 7 percent iron, 3.0 to 4.5 percent tungsten, 2.5 percent cobalt, 1.0 percent silicon, 1.0 percent manganese, 0.35 percent vanadium, 0.08 percent carbon, 0.04 percent phosphorus and 3.03 percent sulfur; and an alloy of about 40 percent nickel, 31 percent iron, 21 percent chromium, 3 percent molybdenum, 1.75 percent copper, 0.60 percent manganese, 0.40 percent silicon, and 0.05 percent carbon.

of about from 1 N to 10 N and containing a reducible aromatic nitro compound in no more than about 10 weight percent of the weight of said catholyte bath.

7. The process of claim 6 wherein said ion exchange resin is impregnated into a noncorrosive porous support member.

8. The process of claim 6 wherein said ion exchange resin is impregnated into a noncorrosive porous support member constructed of a fabric woven from fibers of at least one material selected from the class consisting of vinyl chloride-acrylonitrile copolymer, glass, polyvinylidene chloride, and vinyl chloride-vinyl acetate copolymer.

9. The process of claim 6 wherein said ion exchange resin comprises a polymer of styrene-divinyl benzene containing chemically bonded ionizable radicals selected from the group consisting of $-N(R')_3(R^2)^+ \ldots Y^-$ and $-SO_3^- \ldots M^+$, wherein $R'$ is selected from the class of lower alkyl groups and bonds of a heterocyclic ring and wherein $R^2$ is a lower alkyl group, $Y^-$ is an anion and $M^+$ is a cation.

10. The process of claim 6 wherein the aromatic nitro compound in said catholyte bath is nitrobenzene.

11. The process of claim 6 where said cathode is selected from the group consisting of titanium; molybdenum; an alloy of 45 to 65 percent copper, 10 to 18 percent nickel, and 17 to 45 percent zinc; an alloy of 54 percent nickel, 15 to 17 percent molybdenum, 14.5 to 16.5 percent chromium, 4 to 7 percent iron, 3.0 to 4.5 percent tungsten, 2.5 percent cobalt, 1.0 percent silicon, 1.0 percent manganese, 0.35 percent vanadium, 0.08 percent carbon, 0.04 percent phosphorus and 0.03 percent sulfur; and an alloy of about 40 percent nickel, 31 percent iron, 21 percent chromium, 3 percent molybdenum, 1.75 percent copper, 0.60 percent manganese, 0.40 percent silicon, and 0.05 percent carbon.

12. The process of claim 6 wherein the aromatic nitro compound in said catholyte bath is nitrobenzene, wherein said anode is composed of lead and said electrical current is supplied at a current density of about from 6 to 20 amp./$dm.^2$ of effective cathode area until evolution of hydrogen at the cathode, and wherein the temperature of said catholyte bath is maintained at about from 70° C. to 95° C.

(References on following page)

References Cited

UNITED STATES PATENTS

| | | | |
|---|---|---|---|
| 2,537,304 | 1/1951 | Condit | 204—75 |
| 2,827,426 | 3/1958 | Bodamer | 204—98 |
| 3,304,272 | 2/1967 | Zenftman | 260—2.1 |
| 3,356,607 | 12/1967 | Eisenman et al. | 204—301 |

OTHER REFERENCES

Brigham et al.: The Electrolytic Reduction of Nitrobenzene to P-Aminophenol, Transaction of the Electrochemical Society, vol. 61, 1932, pp. 281–287.

McKee et al.: Electrolytic Reduction of Nitrol Compounds in Concentrated Aqueous Salt Solutions, Transactions of the Electrochemical Society, vol. 68, 1935, pp. 329, 337–345, and 353–355.

JOHN H. MACK, Primary Examiner

H. M. FLOURNOY, Assistant Examiner

U.S. Cl. X.R.

204—59